3,274,172
DISAZO DISPERSE DYESTUFFS
Eiji Koike and Fujio Kanazawa, Toyonaka-shi, Japan, assignors to Sumitomo Chemical Company, Ltd., and to Toyo Spinning Co., Ltd., both of Osaka, Japan, both corporations of Japan
No Drawing. Filed Aug. 16, 1963, Ser. No. 302,735
Claims priority, application Japan, Sept. 24, 1962, 37/41,813
1 Claim. (Cl. 260—187)

The present invention relates to new disazo disperse dyestuffs having the general formula,

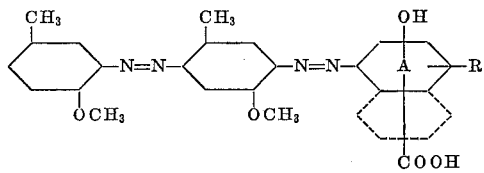

wherein A represents a nucleus selected from benzene and naphthalene nuclei, and R is selected from hydrogen atom and methyl radical; and to a method for producing the same.

An object of the present invention is to provide new disazo disperse dyestuffs which have excellent dyeability to fibers, films and the like shaped articles, particularly to synthetic fibers, containing polyolefine such as polyethylene and polypropylene. Another object is to provide a method for producing the disazo disperse dyestuffs as mentioned above. Still another object is to provide a method of dyeing synthetic fibers, films and the like shaped articles, containing polyolefine such as polyethylene and polypropylene with high fastnesses to light, organic solvents and washing. Further object is to provide synthetic fibers, films and the like shaped articles containing polyolefine such as polyethylene and polypropylene which are dyed with a dyestuff as mentioned above. Other objects would be apparent from the following description.

The disazo dyestuffs according to the invention may be produced by coupling diazotized 4-amino-3,2'-dimethoxy-6,5'-dimethyl-1,1'-azobenzene (the diazo component) with a hydroxycarboxylic acid compound (the azo component) having the general formula,

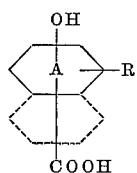

wherein A represents a nucleus selected from benzene and naphthalene nuclei, and R is selected from hydrogen atom and methyl radical.

The diazo component, 4-amino-3,2'-dimethoxy-6,5'-dimethyl-1,1'-azobenzene, may be produced by coupling diazotized 2-methoxy-5-methylaniline (cresidine) with 2-methoxy-5-methylaniline (cresidine), according to the known diazotization and coupling procedure.

The azo component to be coupled with the diazo component thus prepared is selected from hydroxycarboxylic acid compounds having benzene or naphthalene nucleus, examples of which involve 2-hydroxybenzoic acid, 3-hydroxybenzoic acid, 4-hydroxybenzoic acid, 1-hydroxynaphthalene-2-carboxylic acid, 2-hydroxynaphthalene-3-carboxylic acid, 2-hydroxy-6-methylbenzoic acid, 2-hydroxy-4-methylbenzoic acid, and the like. The procedure for the diazotization of the diazo component and the coupling thereof with the hydroxycarboxylic acid compound would be obvious to those skilled in the art.

The disazo dyestuffs according to the present invention can be used for dyeing fibers (in the form of thread, yarn and woven and knitted fabrics and textiles), films and other shaped articles, containing polyolefines, for example, polyethylene and polypropylene, under a dispersing condition in an aqueous medium according to the conventional procedures, with high exhaustion and fastnesses.

The characteristic of the dyestuffs according to the present invention from the viewpoint of the chemical structure, is considered to be in a combination of two methyl and two methoxy radicals present at specific positions in the diazo component, with the structure of the aromatic hydroxycarboxylic acid in the azo component. The present dyestuffs have extremely superior properties, besides their specific color tones, when compared with the other dyestuffs produced using, as the diazo component, 4-amino-1,1'-azobenzene per se, i.e. that having no substituent, and various other 4-amino-1,1'-azobenzene derivatives having one or more non-dissociative substituents such as methyl, methoxy, halogen and nitro substituents at other positions. In other words, the present dyestuffs exhibit excellent exhaustion and high fastnesses to light, organic solvents and sublimation, on polyolefine articles, when compared with the heretofore known dyestuffs having analogous structure. If an azo component having no carboxy radical is used with the present diazo component, the dyestuff obtained is too oleosoluble and has an inferior fastness to sublimation. Contrarily, the aromatic hydroxycarboxylic acid compopund as the azo component endows the dyestuff with an adequate degree of inorganic properties without sacrifice of affinity to polyolefine articles. Thus, the characteristic of the present dyestuffs comprises the fact that the specificity in the diazo component is combined with that in the azo component.

The disazo dyestuffs according to the present invention may be used in particles finely divided by a suitable means, more preferably, as a mixture of such particles with an agent such as alkylnaphthalenesulfonic acid-formaldehyde condensate. Dyeing of polyolefine articles is effected, as in the ordinary disperse dyestuffs, in the form of an aqueous dispersion or suspension at a bath temperature of 80° to 120° C., in the presence of an anionic or nonionic surface active agent as the case may be.

The following examples are given in order to illustrate the invention and not to limit the invention, and, in the examples, parts and percent are described in the meanings by weight unless otherwise identified.

*Example 1*

To 250 parts of water, 28.5 parts of 4-amino-3,2'-dimethoxy-6,5'-dimethyl-1,1'-azobenzene and 30 parts of 35% hydrochloric acid are added, and the mixture is stirred. Then 7 parts of sodium nitrite dissolved in 20 parts of water is added under stirring thereto.

The diazotization reaction is carried out under stirring for 2 hours at 20°–25° C. On the other hand, a solution of 18.8 parts of 1-hydroxynaphthalene-2-carboxylic acid, 6 parts of sodium hydroxide and 8 parts of sodium carbonate, dissolved in 150 parts of water, is cooled by adding 100 parts of ice. The solution of the diazotized monoazo-amino compound prepared as above is added dropwise thereto, and the stirring is continued for 2 hours, while maintaining the temperature of the reaction mixture at not higher than 5° C.

The reaction mixture is filtered and the separated solid dyestuff is washed with water and dried.

The dyestuff weighs 44 parts and is represented by the following formula,

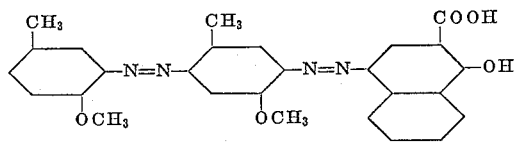

Example 2

Two parts of the dyestuff prepared in Example 1 is finely divided and added to an aqueous solution of 3 parts of sodium oleyl sulfate dissolved in 8,000 parts of water.

Into the dispersion of the dyestuff, 200 parts of a fabric made of polyolefine fiber, is dipped and the temperature is raised slowly up to 80°–120° C., and the fabric is dyed at this temperature for 1 hour.

Then, the fabric is washed with 10,000 parts of a 0.2% aqueous sodium alkylbenzenesulfonate solution at 95° C. for 10 minutes, then washed with water and dried.

In this way, the polyolefine fiber can be dyed in purplish red color with high fastnesses to light, washing, sublimation and organic solvents.

Example 3

Similarly as in Example 1, 28.5 parts of 4-amino-3,2'-dimethoxy - 6,5'-dimethyl-1,1'-azobenzene is diazotized, and coupled with 18.8 parts of 2-hydroxy-naphthalene-3-carboxylic acid.

The dyestuff weighs 44 parts and is represented by the following formula,

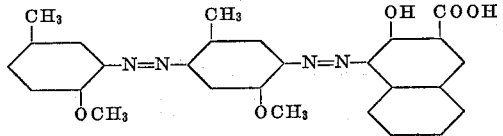

and dyes polyolefine fibers in greyish blue color with high fastnesses to light, sublimation and organic solvents, by the procedure as in Example 2.

Example 4

Similarly as in Example 1, 28.5 parts of 4-amino-3,2'-dimethoxy-6,5'-dimethyl-1,1'-azobenzene is diazotized. A solution of 13.8 parts of 4-hydroxybenzoic acid, 6 parts of sodium hydroxide and 8 parts of sodium carbonate, dissolved in 120 parts of water, is cooled by addition of 100 parts of ice. The solution of the diazotized monoazoamino compound prepared as above is added dropwise thereto, and the stirring is continued for 2 hours, while maintaining the temperature at not higher than 5° C.

The reaction mixture is filtered and the separated solid dyestuff is washed with water and dried.

The dyestuff, weighing 39.5 parts, is represented by the following formula,

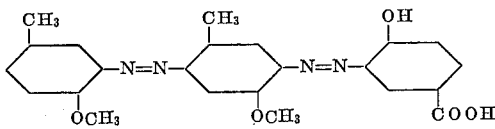

and dyes polyolefine fibers in orange color with high fastnesses to light, sublimation and organic solvents, by the procedure as in Example 2.

Example 5

Similarly as in Example 4, 4-amino-3,2'-dimethoxy-6, 5'-dimethyl-1,1'-azobenzene is diazotized and coupled with 15.2 parts of 2-hydroxy-3-methylbenzoic acid instead of the 4-hydroxybenzoic acid.

The dyestuff, weighing 41 parts, is represented by the following formula,

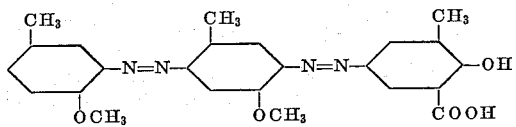

and dyes polyolefine fibers in orange color with high fastnesses by the procedure as in Example 2.

What we claim is:

A disazo disperse dyestuff having the general formula,

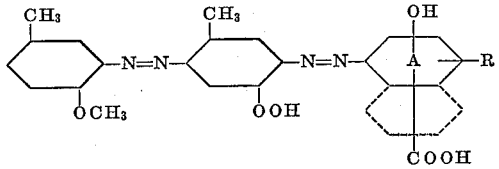

wherein A represents a nucleus selected from the group consisting of benzene and naphthalene nuclei, and R is selected from the group consisting of hydrogen atom and methyl radical.

References Cited by the Examiner

UNITED STATES PATENTS

| | | | |
|---|---|---|---|
| 1,557,265 | 10/1925 | Miller | 260—187 |
| 2,782,185 | 2/1957 | Merian | 260—187 X |
| 3,096,140 | 7/1963 | Gaetani | 8—41 |
| 3,096,847 | 7/1963 | Gaetani | 260—187 |
| 3,158,435 | 11/1964 | Gaetani et al. | 8—41 |

FOREIGN PATENTS 10,187  9/1909  Great Britain.

CHARLES B. PARKER, *Primary Examiner.*

JOSEPH P. BRUST, *Examiner.*

R. J. FINNEGAN, D. M. PAPUGA,
*Assistant Examiners.*